UNITED STATES PATENT OFFICE.

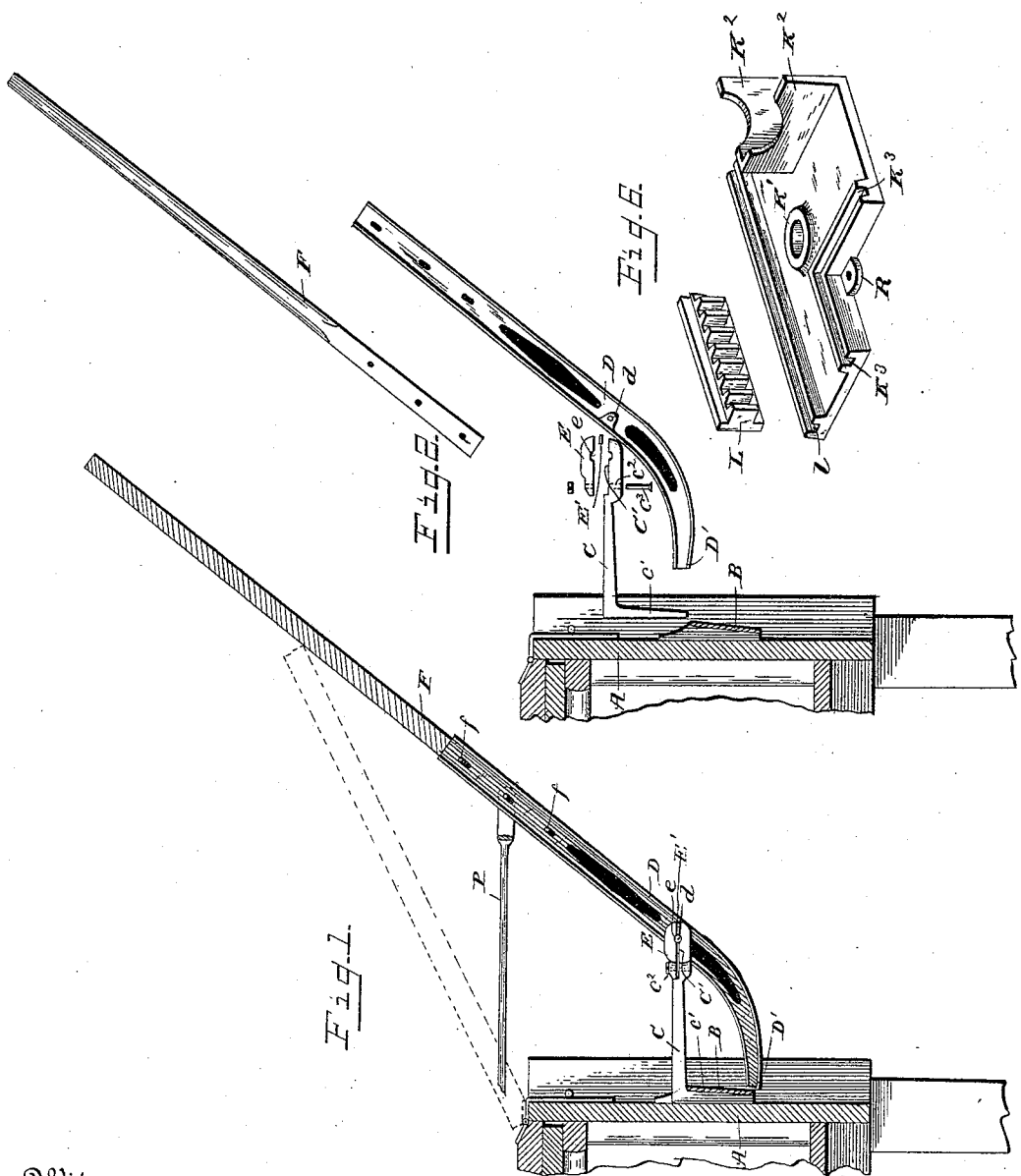

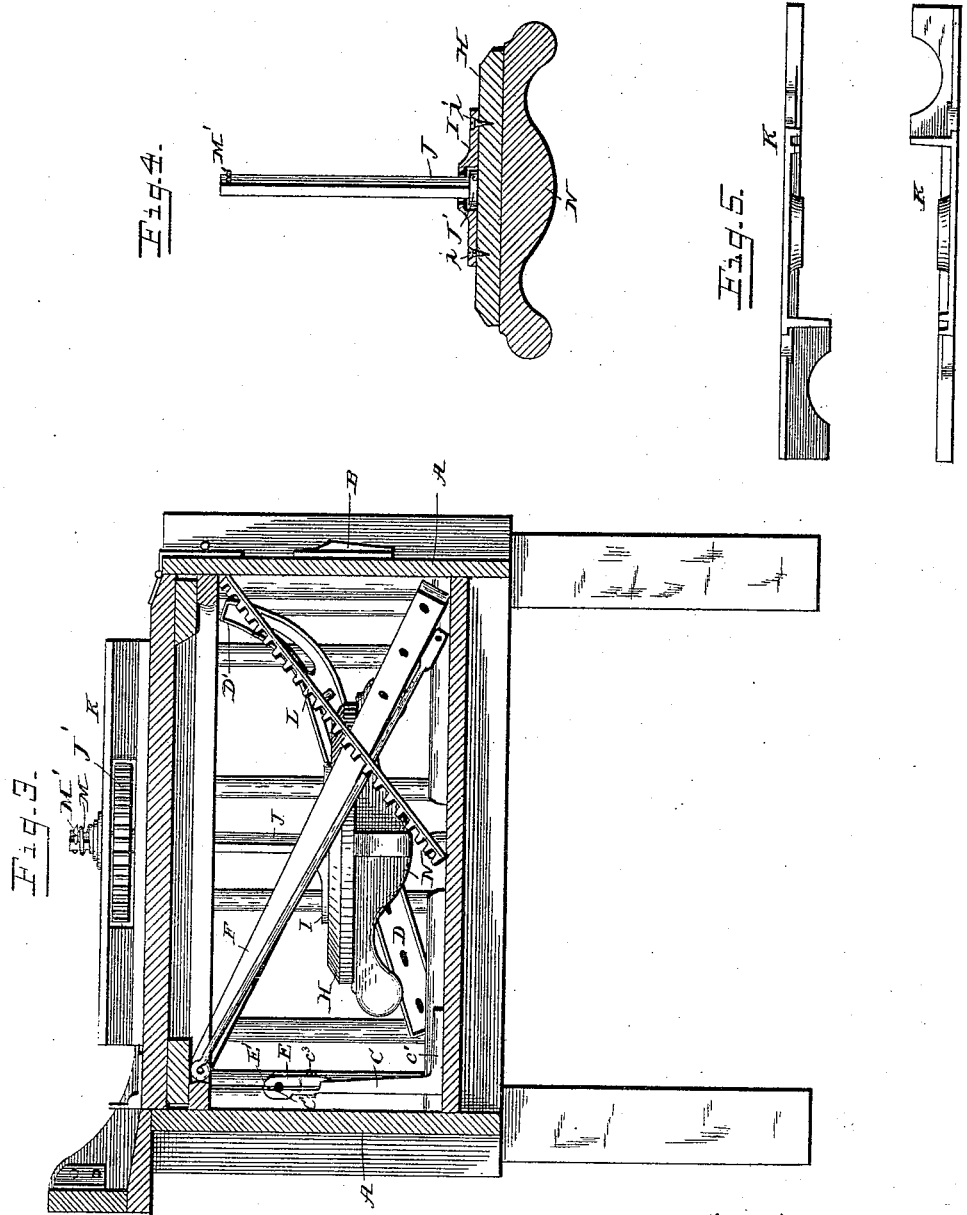

CAMDEN MEARS AND JOHN W. MEARS, OF BLOOMSBURG, PENNSYLVANIA.

WASHING-MACHINE.

SPECIFICATION forming part of Letters Patent No. 443,778, dated December 30, 1890.

Application filed June 28, 1887. Serial No. 242,752. (No model.)

*To all whom it may concern:*

Be it known that we, CAMDEN MEARS and JOHN W. MEARS, citizens of the United States, residing at Bloomsburg, in the county of Columbia and State of Pennsylvania, have invented certain new and useful Improvements in Washing-Machines, of which the following is so full, clear, and exact a description as will enable others skilled in the art to which our invention appertains to make and use the same, reference being had to the accompanying drawings, in which—

Figure 1 is a longitudinal vertical section of our improved handle and the supports and other appurtenances for use therewith. Fig. 2 is a side elevation of the same, showing the various parts detached. Fig. 3 is a vertical section of our improved washing-machine, showing the detachable parts separated and put inside of the washing-machine. Fig. 4 is a detail view of the rubber and a ball-and-socket joint for use therewith. Fig. 5 is a detail view of two reversible plates. Fig. 6 is a perspective view of one of the reversible plates with the toothed rack shown in position slightly above the same.

The objects generally of our invention are to provide a washing-machine which will be simple and effective in its construction and operation and one which will be so cheap as to be within the reach of the masses. These objects are accomplished in the manner hereinafter described; and the invention consists in the construction, combination, and arrangement of parts, as will be hereinafter pointed out in the appended claims.

The main body of the washer is designated by the letter A, to one side of which is secured the socket B, which is adapted to receive the bracket C, which is provided with the downwardly-projecting end $c'$, adapted to slip in and out of the socket B. The outer portion of the bracket C is provided with a depression C', beyond which is a semicircular depression, which forms a journal-bearing for the trunnion $d$ on the skeleton handle D. The outer portion of the bracket C is also perforated at $c^2$ to receive a bolt $c^3$, which is adapted to secure a removable plate E, also provided with a semicircular depression $e$, which completes a journal-box for the trunnion or journal bearing $d$ on the skeleton handle D. This trunnion or journal bearing $d$ on the handle D is of a greater diameter than the journal box or bearing formed by the coupling of the removable plate E and the outer portion of the bracket C. The object of this is to allow the adjustment of the movable plate toward the stationary plate or bracket C to compensate for the wear at this point.

E' designates a piece of pasteboard or a thin strip of wood or any other equivalent which may be used to keep the plate E and the outer portion of the bracket C slightly apart until after the trunnion has become sufficiently worn to cause it to run smooth and without friction.

The upper portion of the skeleton handle D is perforated to receive bolts $ff$, which are adapted to extend through the wooden handle F and the perforations in the skeleton handle. The lower end of the skeleton handle is provided with a projecting end D', which is adapted to abut against the socket B when the washing-machine is open and its cover tilted up and back, as shown in dotted lines in Fig. 1, wherein the bracket C acts as a fulcrum and the handle as a lever to support said cover.

The automatically self-adjusting head H is provided with a removable plate I, secured thereto by screws $i$, and which is perforated centrally and adapted to receive the angular rod J, upon the lower end of which is an enlarged portion or head J'. The opening through the plate I is slightly larger than the rod which extends through it, which allows the rotating head to rock on the end of the rod; but said opening is angular in form to cause the rotation of said plate I when the rod J is revolved. This construction admirably adapts the rubber H to adjust itself to the clothing, whether they be evenly distributed through the washer or whether the greater portion be near one side of the washer, all of which will be readily understood and appreciated.

The rod J slides vertically through a master-wheel J' in the top of the machine, as has been fully explained in our application, Serial No. 218,609, filed on the 11th day of November, 1886, for an improvement in washing-machines, and upon which this invention is designed as an improvement.

By reference to the other application referred to, the operation of the other parts of the machine will be clearly and distinctly understood.

The plates K K are to be used on the top of the machine to hold the gear-wheel and its rack-bar in place, and they are made reversible and interchangeable to compensate for wear, and may be reversed when it is found desirable. These plates are precisely identical in shape, size, and construction, so a description of one will suffice for both. The central raised boss K' of the lower plate supports the weight of the gear-wheel J', and the rod J passes through the hole therein. The webs K² of one plate fit into the corresponding grooves K³ of the other when one is placed above the other, and screws or bolts are passed through the perforated ears R into the body of the machine for holding the plates in place. Along one side of the plates K is a pair of registering grooves $l$, within which the toothed rack L reciprocates, the teeth thereof intermeshing with the teeth of the wheel J', as will be clearly understood without a more explicit description.

The movable rubber or head H is provided with rounded extensions at its outer edge which extend beyond the edge of the head proper, and it is provided with a bulb or curved extension in its center, which admirably adapts it for use as an agitator to clothing, the central portion or projection N serving to stir the clothing beneath the center of the rubber.

From the foregoing it will be readily understood that a machine constructed after this description will be light and will be one which may be easily operated. Parts may be readily taken apart and put together, and when taken apart may be placed inside the washer to be shipped from point to point, and the machine, by reason of its various advantages and improvements, will meet a popular demand which is everywhere felt, and will be a great labor-saving device wherever it is used.

The upper end of the rod J, which supports the rubber, is provided with a coil-spring M, surrounding it and held thereon beneath the pin M' for supporting said rod and head, and which will deaden the shock on the cover and to the machine and head when the cover is closed and the head drops down into the washer. A bracket C being placed in position in the socket B and the handle D F pivoted thereto in the manner above described, a pitman-rod P is connected at its ends to said handle and to the rack-bar L, and when the handle is reciprocated said rack-bar L is moved backward and forward against the wheel J' on the bar J, whereby the latter is revolved in a manner which will be well understood without further explanation.

Having now described the objects, uses, and advantages and having set forth a preferred means of constructing our device, what we desire to secure by Letters Patent and what we therefore claim is—

The bracket C, having cut-away portions C' at its outer upper end and a transverse semicircular groove therein, and the plate E, having a registering semicircular groove $e$ in its lower face, in combination with a handle D, having a laterally-projecting trunnion $d$, a bolt $c^3$ for clamping said plate E upon said bracket to form a bearing for said trunnion, and a block E' for keeping the outer ends of said bracket and plate slightly separated, as and for the purposes specified.

In testimony whereof we affix our signatures in presence of two witnesses.

CAMDEN MEARS.
JOHN W. MEARS.

Witnesses to the signature of Camden Mears:
VINTON COOMBS,
CHAS. J. STOCKMAN.

Witnesses to the signature of John W. Mears:
G. M. QUICK,
A. N. YOST.